United States Patent [19]

Cole

[11] 4,218,991
[45] Aug. 26, 1980

[54] PET COLLAR

[76] Inventor: Edwin L. Cole, P.O. Box 135, Eugene, Oreg. 97401

[21] Appl. No.: 928,955

[22] Filed: Jul. 28, 1978

[51] Int. Cl.² .......................................... A01K 27/00
[52] U.S. Cl. ................................. 119/106; 119/156
[58] Field of Search ........................ 119/106, 109, 156; 40/21 C, 21 R; 2/338

[56] References Cited

U.S. PATENT DOCUMENTS

| 2,205,711 | 6/1940 | Banks | 119/106 |
| 2,219,569 | 10/1940 | Vanderhoof | 119/106 X |
| 3,721,216 | 3/1973 | Lippe et al. | 119/106 |
| 3,864,856 | 2/1975 | McManus | 40/21 C |

FOREIGN PATENT DOCUMENTS 383450 11/1932 United Kingdom ................ 119/106

Primary Examiner—Louis G. Mancene
Assistant Examiner—Robert P. Swiatek
Attorney, Agent, or Firm—James D. Givnan, Jr.

[57] ABSTRACT

A pet collar with a retainer thereon for reception of a removable, flexible strip. The retainer defines a channel with opposed, flexible flanges extending inwardly over a strip within the channel to confine the strip. The flanges are of a deformable nature for strip removal. A collar is also shown having an integrally formed retainer. An identification strip may also be held in place within the retainer.

5 Claims, 8 Drawing Figures

PET COLLAR

BACKGROUND OF THE INVENTION

The present invention pertains generally to pet collars of the type embodying a strip of synthetic material containing an insecticide for fleas, ticks, etc.

In common use today are pet collars consisting of a strip of synthetic material in the form of a collar having a buckle arrangement for collar securement about the pet's neck. Periodically collar replacement must be made as the potency of the insecticide gradually diminishes over a period of months. With currently marketed collars, the entire collar is disposed of after a few months use. While such collars are highly practical, they are somewhat costly to replace and some pet owners find their appearance unattractive and hence a second or decorative collar is sometimes worn by the pet.

The concept of retaining insecticide material on a collar is shown in the prior art by the following U.S. Pat. Nos.: 2,219,569; 2,406,253; 3,978,820; and; 4,031,859.

SUMMARY OF THE PRESENT INVENTION

The present invention is embodied within a collar arrangement enabling the convenient replacement of a strip of flexible material within a pet collar rendering same of an attractive, conventional appearance when worn.

A strip of insecticide is utilized of uniform cross section lending itself to inexpensive production methods enabling low cost replacement strips insertable at proper intervals by the pet owner. A holder includes pliable retention means to receive and retain the strip against all but intentional movement relative to the collar. In a first form of the invention, a strip retainer is provided with an adhesive surface for permanent securement to the inner side of a conventional pet collar. When so worn, a large surface area of the strip is directly exposed to the pet. An optional form of this first form of the invention provides for timed release of an insecticide by openings formed in the strip retainer. A still further modified form of the present invention is embodied within a permanent pet collar having integrally formed retention means formed along its sides between which is received an insecticide strip. This latter form of the invention includes a buckle arrangement for securement in the usual manner.

Important objectives of the present invention include the provision of a collar arrangement providing for the convenient replacement of flexible strips at periodic intervals; the provision of a collar arrangement having identification or insecticide strip retention means engageable with the strip edges to retain same against inadvertent dislodgment; the provision of a collar arrangement exposing a large surface area of a replaceable strip for proper exposure of the insecticide; the provision of a strip retainer for adhesive attachment to one side of a conventional pet collar; the provision of a retainer having openings therein and therealong on both sides of an inserted strip for circulation of air over the strip; the provision of a collar arrangement having integrally formed retention means formed along its edges; the provision of a retainer with an adhesive surface for strip application to any supporting surface to thereafter receive an inserted strip bearing insecticide or various identification indicia.

DETAILED DESCRIPTION OF THE PREFERRED EMBODIMENTS

Figure 1:
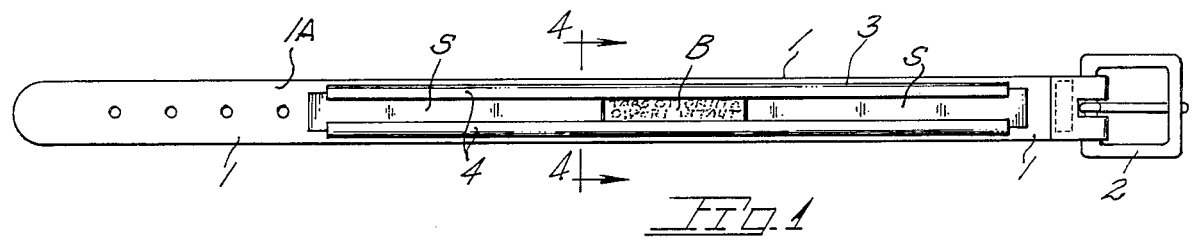
FIG. 1 is a plan view of the inner side of a pet collar with one form of the invention in place thereon.
Figure 2:
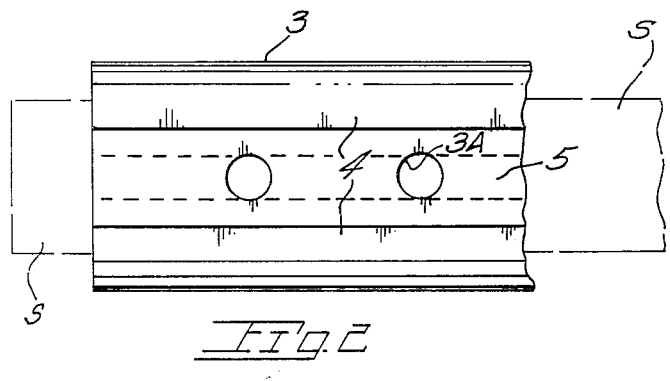
FIG. 2 is an enlarged fragmentary plan view of a retainer with a segment of insecticide strip therewithin.

With continued attention to the drawing, the reference numeral 1 indicates a pet collar of conventional construction provided with a buckle 2 for closure of the collar.

Figure 3:
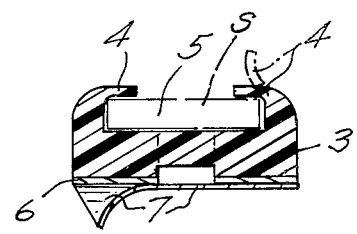
FIG. 3 is a sectional view of a retainer removed from the collar.
Figure 4:
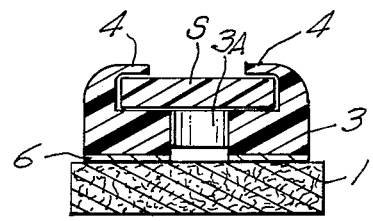
FIG. 4 is a cross sectional view taken along line 4—4 of FIG. 1.

In place on the inner side of collar 1, as viewed in FIG. 1, is an elongate retainer 3 having opposed, inwardly directed resilient flanges 4 which, along with the main body portion 3 of the retainer, define a lengthwise extending opening or channel 5. Resilient flanges 4 are of reduced cross section at their extremities, per FIG. 3, to facilitate upward displacement of same during manual insertion of an insecticide strip S.

An identification block at B may be of the same sectional configuration as strip S to permit insertion between flanges 4 for pet identification.

For purposes of securement to collar 1 a layer of adhesive 6, provided on the underside of the retainer which adhesive is protected by a removable cover strip 7 until application is to be made to the inner collar surface at 1A.

Retainer 3 may additionally define openings as at 3A in main body portion which communicate with one side of strip S to increase strip exposure for purposes of insecticide dispersal. Depending on the chemical composition of the strip, in some instances it may be desirable to make main body portion 3 of the retainer imperforate dispensing with openings 3A.

Figure 5:
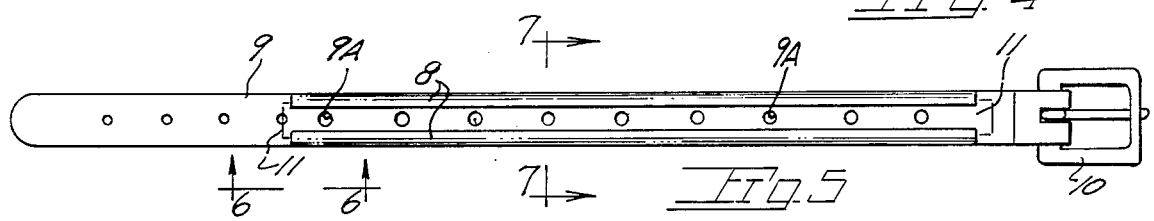
FIG. 5 is a plan view of the inner side of a collar embodying a modified form of the invention.
Figure 6:
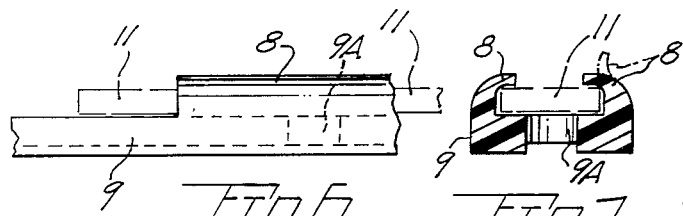
FIG. 6 is an elevational view taken along line 6—6 of FIG. 5.
Figure 7:
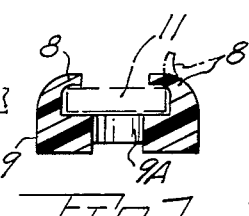
FIG. 7 is a sectional view taken along line 7—7 of FIG. 5.

With attention now to the modified form of the invention shown in FIGS. 5 through 7, retention means at 8 is embodied within integrally formed flexible flanges formed along a collar 9. Collar portion 9 is provided with a securement arrangement at one of its ends such as a conventional buckle at 10 to receive a planar collar end segment. The pet collar so provided is of monolithic construction preferably formed of a durable synthetic plastic of a type chemically inactive with an inserted insecticide strip at 11. As with the first form of the invention, openings at 9A may be provided to increase that area of the insecticide strip exposed to the air for purposes of insecticide efficiency.

For the purpose of removing and inserting an insecticide strip, the retainer flanges may be temporarily deformed to receive the insecticide strip after which the inherent resiliency of the retainer will act to grip the strip to hold same against displacement.

Figure 8:
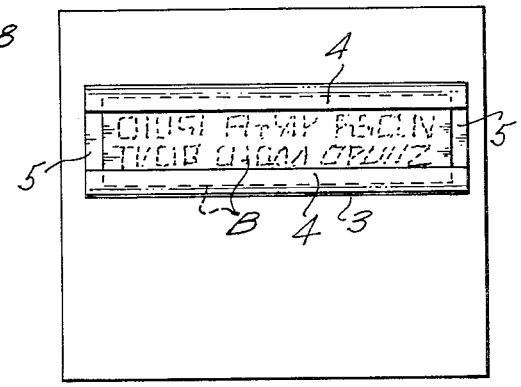
FIG. 8 is an elevational view of a retainer with identification indicia inserted therein.

As shown in FIG. 8, the main body portion 3 of the retainer may be adhesively applied to various other surfaces, other than pet collars, and thereafter serve to receive inserted strip material at B bearing printed indicia for a variety of identification or notification purposes.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. In combination,
a pet collar,
an elongate flexible retainer secured to the inner side of said collar and having a main body portion of flexible material defining a channel and having lengthwise orientated resilient flanges for retentive engagement with an insecticide bearing strip disposed in said channel and between said flanges, said flanges being of a flexible nature to facilitate release of said strip for removal and replacement of said strip.

2. The invention claimed in claim 1 wherein said retainer is of uniform section throughout its length to enable low cost extrusion of same with an adhesive coating on one surface for pressure sensitive application to the collar.

3. The invention claimed in claim 1 wherein said flanges are of reduced cross section at their extremities to facilitate flexure of same.

4. The invention claimed in claim 1 wherein said retainer is formed integral with but of lesser length than the pet collar.

5. The invention claimed in claim 4 wherein said flanges are of reduced cross section at their extremities.

* * * * *